Nov. 5, 1968
J. M. MURRAY
3,408,796
CENTRIFUGAL FAN SEPARATOR UNIT
Filed Sept. 16, 1964
3 Sheets-Sheet 1
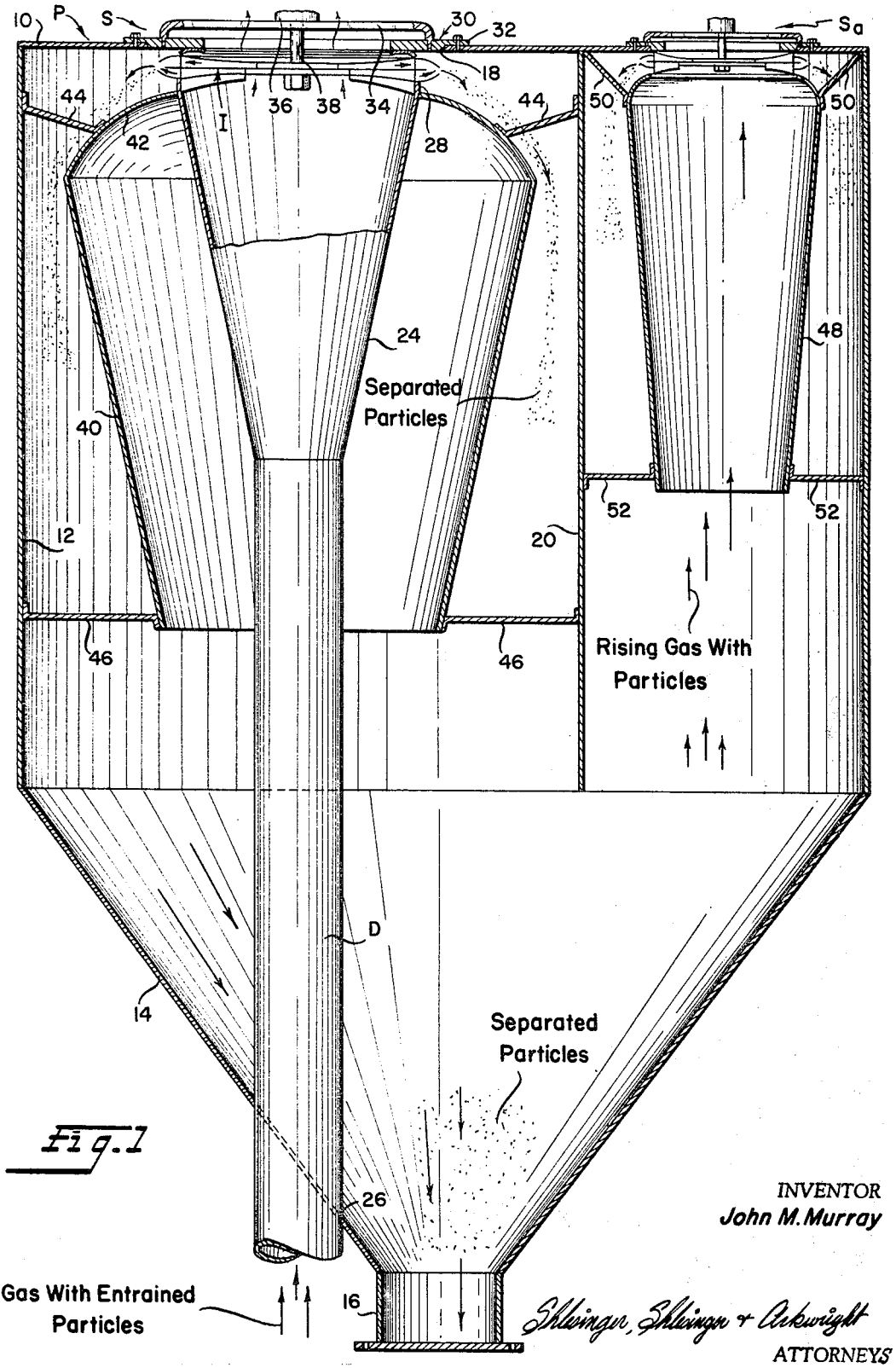
INVENTOR
John M. Murray
Shlesinger, Shlesinger & Arkwright
ATTORNEYS Nov. 5, 1968  J. M. MURRAY  3,408,796
CENTRIFUGAL FAN SEPARATOR UNIT
Filed Sept. 16, 1964  3 Sheets-Sheet 2
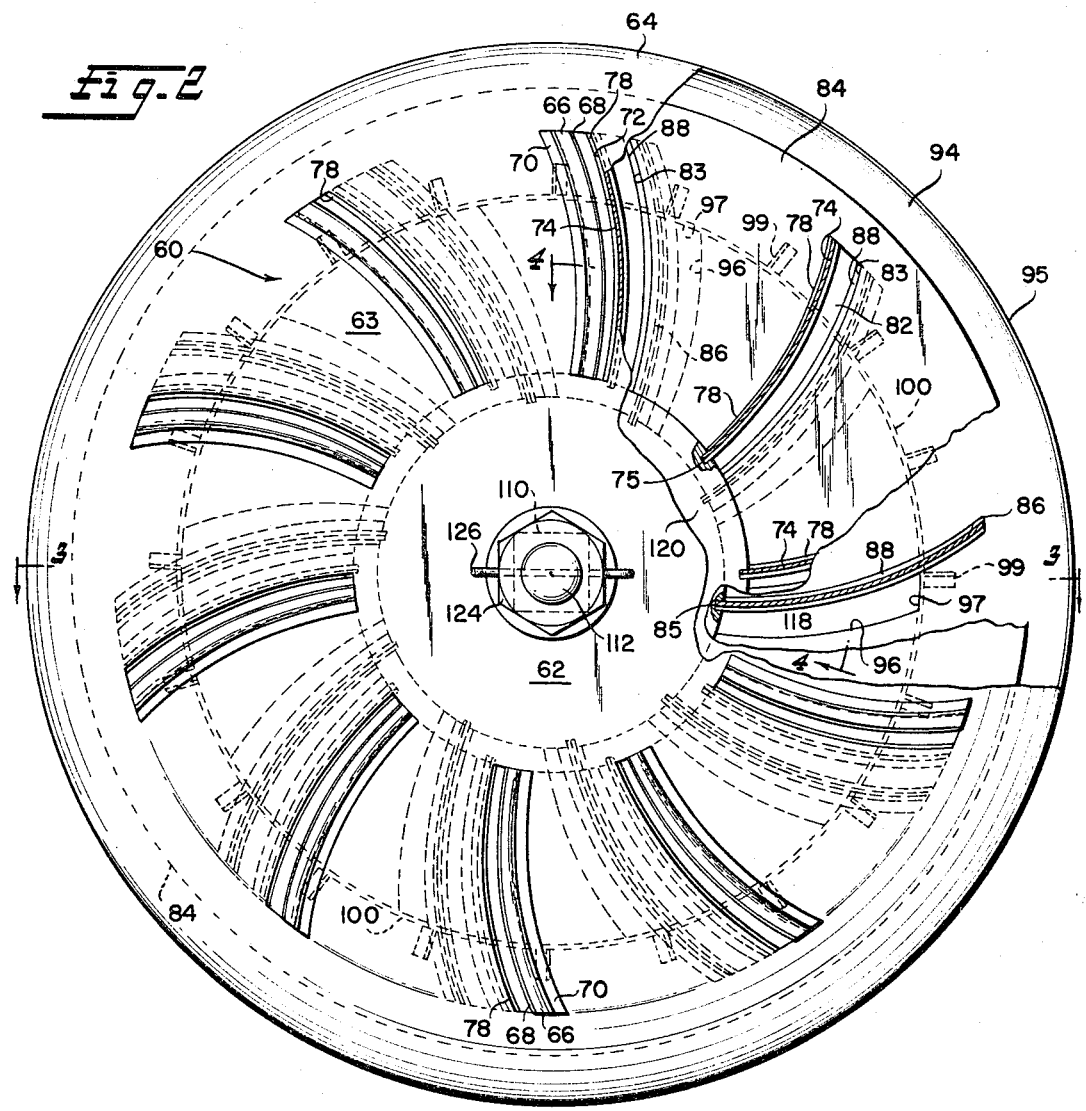
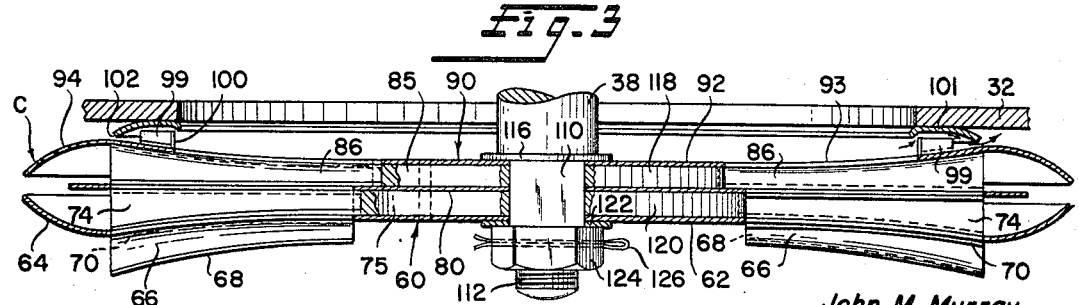
John M. Murray
BY
Shlesinger, Shlesinger & Arbright
ATTORNEYS

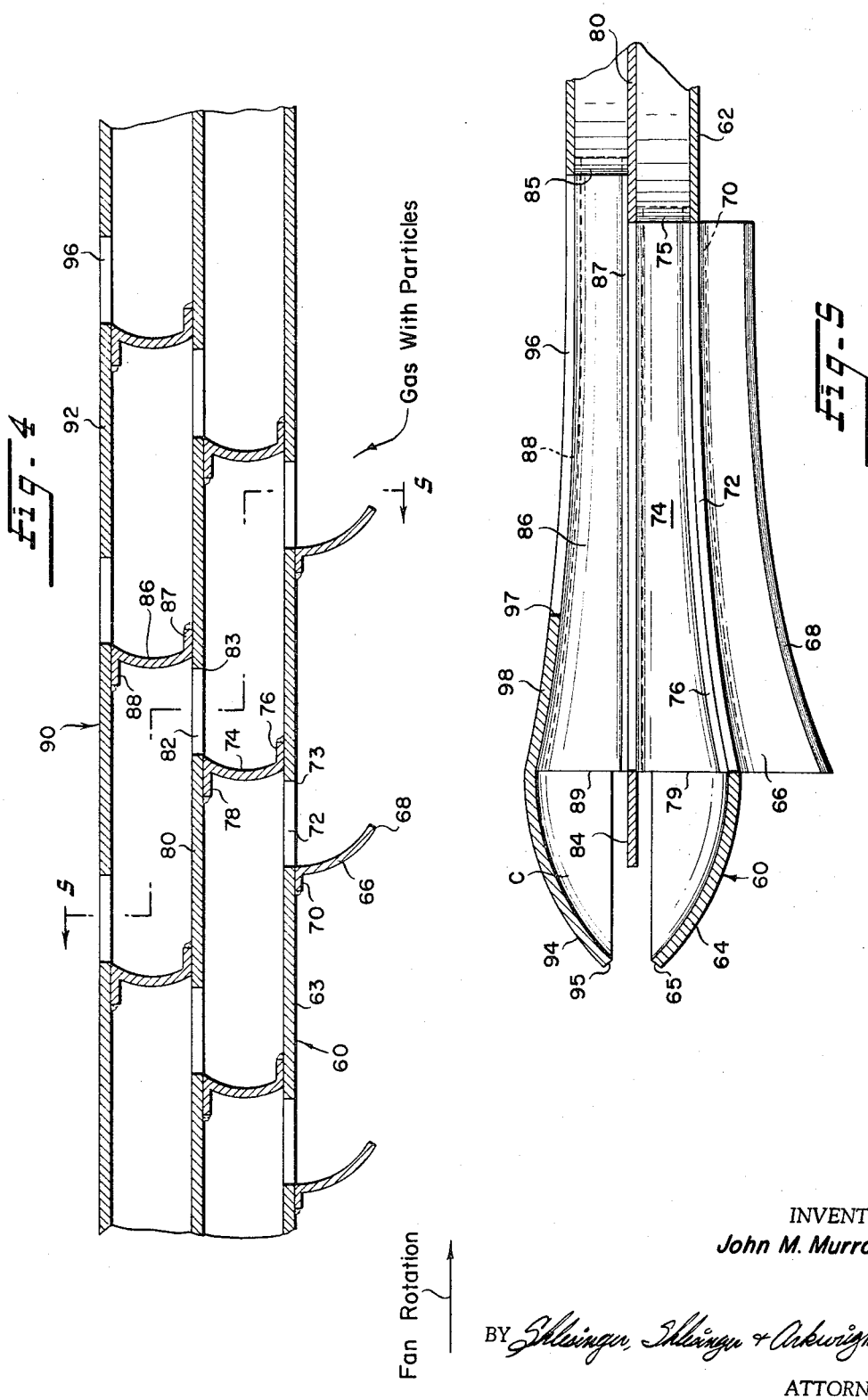

United States Patent Office 3,408,796
Patented Nov. 5, 1968

3,408,796
CENTRIFUGAL FAN SEPARATOR UNIT
John M. Murray, 519 Elizabeth Ave.,
South Charleston, W. Va. 25303
Filed Sept. 16, 1964, Ser. No. 396,864
12 Claims. (Cl. 55—403)

ABSTRACT OF THE DISCLOSURE

A plurality of axially spaced plates rotatably mounted on a shaft and having circumferentially ports form a multi-stage axial flow separator unit. Corresponding ports in each plate are circumferentially spaced and have an upstanding backwardly curved impeller vane adjacent the trailing edge of each port. Outer peripheral nozzle means discharges centrifugally separated particulate material, while the purified gaseous medium passes axially through the unit. The precipitated unit with a large vane separator and a small auxiliary separator are mounted within a plenum adjacent discharge openings in the top thereof. The main separator is connected at its intake side to an impure gas source which extends into the plenum, the discharge side of the main separator passing purified gaseous medium out through the discharge opening of the plenum. A small auxiliary separator unit of the same type is mounted within the plenum adjacent the small auxiliary discharge opening, the intake flow from within the plenum being balanced to match the peripheral discharge flow of the main separator unit.

---

This invention relates to centrifugal type separator units, and more particularly to axial type fan units.

The centrifugal type separator unit of this invention provides a compact multi-stage unit which has a novel impeller and gas port design, as well as a peripheral discharge chamber and nozzle section arrangement resulting in an axial flow fan unit having a high volumetric capacity and an unusually high ability to separate particles from a gaseous medium in which they are entrained.

The simplicity and compactness of this unit also makes possible the use of a simplified precipitator unit, and the use of a simplified gas seal construction.

The usual type of centrifugal separator unit requires the use of spaced multiple stages within a specially adapted chamber, wherein the stages propel most of the gaseous medium as well as the particulate matter radially outward without providing for a smooth axial flow of the gas medium through the successive stages. This conventional type unit consequently results in high pressure losses and low volumetric capacity with respect to the particulate matter separated from the gaseous medium.

Accordingly, it is the principal object of this invention to provide a centrifugal type separator which has the ability to pass a gaseous medium containing entrained particulate matter axially through the unit.

It is another object of this invention to provide a centrifugal separator unit which has a high efficiency and low pressure loss across the unit.

It is a further object of this invention to provide a separator unit which operates as both a fan and separator unit.

It is still a further object of this invention to provide a compact multi-stage unit which is extremely efficient in removing small particulate matter entrained in a gas medium.

It is a still further object of this invention to provide a simplified centrifugal separator unit of high efficiency which can be readily installed without necessitating changes in existing equipment.

It is a still further object of this invention to provide an improved centrifugal separator of simple design having few parts and of compact design.

It is a still further object of this invention to provide a multi-stage centrifugal fan unit which has a low pressure drop between stages.

It is a still further object of this invention to provide a new impeller design for centrifugal blower units.

It is a still further object of this invention to provide a simplified centrifugal separator unit which incorporates an air seal arrangement.

It is another object of this invention to provide a centrifugal separator unit which has a peripheral discharge chamber and nozzle section for improving efficiency of the unit.

It is a still further object of this invention to provide an impeller unit for centrifugal separators wherein the impeller vane and gaseous port are designed to give better flow characteristics through the unit to the gaseous medium as it passes through the stages of the centrifugal separator unit.

It is still a further object of this invention to provide a simplified centrifugal separator unit which requires very little maintenance.

These and further objects of this invention will become apparent from a reading of the following specification and claims.

In the drawings:

FIGURE 1 shows a sectional view in side elevation of a precipitator housing with the centrifugal separator unit installed thereon.

FIGURE 2 shows a bottom view of the centrifugal separator unit as seen from the upstream side thereof with portions cut away to show successive stages.

FIGURE 3 is a sectional view of the centrifugal separator unit along lines 3—3 of FIGURE 2.

FIGURE 4 shows a sectional view of the centrifugal separator unit along arc 4—4 of FIGURE 2.

FIGURE 5 shows a sectional view of the centrifugal separator unit taken along broken line 5—5 of FIGURE 4.

Referring particularly to the drawings, a precipitator unit is shown in FIGURE 1 which has a top wall 10, a side wall 12, and a conical connecting wall 14 which has an open circular precipitate discharge section 16 at the bottom thereof.

The top wall 10 has an opening 18 in which a centrifugal separator unit generally designated at S is mounted. The entire chamber is divided into a main precipitate receiving chamber and an exhaust chamber by a baffle section 20.

At the top of the exhaust chamber of the precipitator unit, there is an opening having a small centrifugal separator unit designated $S_a$ which is of similar construction to the centrifugal separator S and is in registry with the opening 18.

The main precipitator unit S has a gaseous supply duct D connected thereto by means of an inverted conical section 24, the duct extending upward and through an opening 26 in the lowest conical wall 14 of the precipitator chamber. The inverted conical section 24 of the supply duct D has a collar 28 which extends up to and in close proximity with the lower casing wall of the rotating centrifugal separator unit S.

A plate and frame assembly generally indicated at 30 has a circular, annular ring member 32 which fits over the top precipitator wall 10 and partially within the annular opening 18. A frame 34 is mounted on the ring 32 and supports an electric motor 36 having a shaft 38 which supports the impeller unit generally designated I of the centrifugal separator assembly S.

A precipitate guiding skirt 40 of generally circular configuration and having an upper curved section 42 is connected to the flared conical section 24 of the duct immediately below the peripheral discharge nozzle section of the separator. Upper support members 44 are integral with curved section 42, and lower support members 46 are integral with the bottom section of the depending skirt portion 40 of the precipitator deflection section. It should be noted that an outwardly flared chamber is formed between the wall 12 of the precipitator unit and the depending skirt portion 40 to assist in settling out particles separated from the gaseous medium.

The precipitate particles are expelled out of the peripheral section of the rotating impeller unit I as shown by the arrows and proceeds downwardly along the side wall 12, and along conical wall 14 to the circular precipitate discharge section 16.

The exhaust section of the precipitator housing has a small centrifugal separator unit generally designated $S_a$ positioned immediately below and in registry with annular opening 22 in the top wall 10 of the precipitator housing. Preferably, this unit is the same type of separator unit described above, but is of smaller capacity since only a small percentage of the gaseous medium supplied to the precipitator centrifugal separator unit S by the duct D enters the interior of the precipitator housing assembly.

The mounting arrangement for the exhaust separator unit $S_a$ is the same as that described above for the centrifugal separator unit S. The tapered annular skirt 48 is held in position immediately below the auxiliary separator unit $S_a$ by means of individual support members 50 at its upper end, and support members 52 adjacent its lower end.

The auxiliary separator unit $S_a$ acts as a pressure balance control since its capacity is chosen to approximate the volume of gaseous medium introduced into the interior of the precipitator unit by the peripheral discharge of centrifugal separator assembly S. Also, the use of a small centrifugal separator unit at the precipitator discharge insures that nothing but clean gases are allowed to escape to the atmosphere from the precipitator unit itself. The use of the small centrifugal separator unit $S_a$ insures maintenance free operation of the unit without need for periodic cleaning as is necessary for conventional filter systems.

A face view of the centrifugal separator unit S showing several cutaway sections for purposes of illustration is shown in FIGURE 2 illustrating the view from the bottom of the separator unit S looking toward the unit in the direction along the supply duct D. The entire unit shown rotates in a clock-wise direction as shown.

The entire assembly is directly supported at the end of rotating shaft 38 of motor 36 as shown generally in FIGURE 1 and in detail in FIGURE 3.

A front stage circular plate generally designated at 60 having a central flat section 62, and an annular outwardly curved intermediate section 63, and peripheral inwardly curved annular nozzle casing section 64 having a flat annular edge 65, supports a plurality of radially extending equally spaced first stage impeller vanes 66. Impeller vanes 66 have an outwardly curved outer edge 68 which is connected to the intermediate outwardly curved section 63 of the front first stage plate 60 by a curved flange 70 which forms the inner edge of impeller vanes 66.

The impeller vanes 66, as shown in FIGURE 2 are inclined backwardly away from the direction of rotation, and are arcuately curved along an arc which commences at the intersection of a radial line with the innermost point of the impeller vane 66. The outer peripheral edge 66 of impeller vane 68 is curved outwardly so that width of the impeller blade increases progressively from the innermost to the outermost portions of the impeller blades. The cross sectional configuration of the impeller blades 66 is concave and faces in the direction of rotation of the impeller unit, as shown in FIGURE 4.

Immediately in front of each of the impeller vanes 66 is a gas inlet port 72 which extends the entire length of the impeller vanes 66 and is arcuately curved along and immediately in front of the impeller vane 66 and extends the length thereof. The width of the intake port at a given radial point is substantially the cord length of the impeller vane at that radial point, and preferably the front leading edge of the impeller vane 68 is spaced from the leading edge 73 of the intake port 72 the same distance, to form with these three lengths, an equilateral triangle. It will thus be seen that both the vanes 66 and the arcuate intake port are both arced in a backward direction and that both progressively increase in width at greater radial distance to a maximum value at the outer end of the intake port 72.

FIGURE 2 shows a preferred arrangement with respect to the spacing of the impeller vanes 66, wherein 10 equally spaced vanes are provided subtending an arc 36 degrees between each of the impeller vanes.

The impeller vanes are preferably formed with a continuous and slight arc so that the gaseous and particulate mixture is slipped off the end of the impeller vane with a slightly increased velocity in the peripheral direction as distinguished from the angular velocity imparted by a straight vane member. The arc of the impeller vane is small, the radial line passing through the base of the impeller vane being displaced to approximately 10 degrees ahead of the radial line passing through the outer edge of the impeller vane.

A second stage is formed by a plurality of radially extending backwardly curved impeller vanes 74 as shown in the first cut-away portion of FIGURE 2, which have a slightly greater length than the first stage impeller vanes 66, but have the same arcuate configuration and terminate at the same peripheral point.

As can be seen, in FIGURE 4, the transitional impeller vanes 74 have a leading flange 76 and a trailing flange 78 which are respectively connected to the front first stage plate 60, and a flat circular intermediate transitional plate 80. As can be seen from FIGURE 4, the transverse cross-sectional configuration of the transitional impeller vanes 74 is slightly curved. The transitional impeller vanes 74 also increase in width with the flanged edge 76 bowing outwardly to provide a greater width of the impeller at the peripheral edge thereof.

A plurality of spaced intermediate transitional ports 82 are disposed immediately in front of each of said intermediate stage impeller vanes 74 and extend the length of these vanes. As with the first stage impeller vanes and ports, the width of the impeller vanes are approximately equal to the transverse width across the transitional impeller vanes at a given radial point.

The transitional impeller vanes are positioned immediately in front of each of the leading edges 73 of the initial intake port 72.

The outer periphery 84 of the intermediate transitional plate extends outwardly beyond the periphery of the impeller vanes to a point approximately halfway to the outer periphery 65 of the front first stage plate 60.

The plurality of final stage impeller vanes 86 have a leading flange 87 and a trailing flange 88 which respectively connect them to intermediate transitional plate 80 and the back final stage plate generally indicated at 90. These vanes are disposed immediately in front of each of the leading edges 83 of the intermediate transitional ports 82. The outer edge flange 88 bows outwardly away from the intermediate transitional plate along an arc complementary to that formed by the outer flange 76 of the transitional impeller vanes 74.

The final stage impeller vanes 86 are of the same cross sectional configuration and arcuate shape as the intermediate stage impeller vanes 74. The outer tip 89 of the final stage impeller vanes 86 extend to the same point as the outer tip 79 of the intermediate transitional vanes. However, the final stage impeller vanes 86 are longer than the intermediate stage impeller vanes 74, as can be seen with references to the innermost edge sectoins 75 and 85 respectively.

The back final stage plate 90 has a similar configuration as the front first stage plate 60 and is complementary thereto, having a central flat circular section 92, an outwardly bowed section 93 which is integral with the outward flange 88 of the final stage impeller vanes 86, and an inwardly curved annular peripheral section 94 having a flat circular edge 95. The complementary front first stage plate 60 and back final stage plate 90 are held in fixed relation to each other by a shaft 38 to provide a compact, sturdy unitary separator assembly.

Final stage discharge ports 96 are cut in the bowed intermediate annular section 93 immediately in front of the end flanges 88 of the final stage impeller vanes 86 and have a width at a given radial point equal to the width of the final stage impeller vanes 86.

However, it should be noted that the port 96 begins at the base section 85 of the final stage impeller vanes 86 and only extends to an upper edge 97 which is considerably shorter than the radial extent of the final stage impeller vanes 86, as can be seen in FIGURE 5. This leaves a baffle section 98 in the back final stage plate 90 which acts to force the mixture behind it outwardly into the particulate annular discharge chamber generally designated C which is formed between the annular peripheral curved sections 64 and 94 of the front first stage and back final stage plates respectively.

This construction assures that a high percentage of the gaseous mixture passing through the intermediate ports 82 from the upper tip sections of the intermediate stage impeller vanes 76 will be directed peripherally outward through the peripheral discharge chamber C.

However, it should be noted that due to the closeness of the peripheral annular edges 65 and 95 of the annular discharge chamber C a nozzle is formed which permits the particulate matter to pass therethrough, and also creates a back pressure which acts to retain the gases and to restrict their centrifugal velocity resulting in a higher percentage of gases passing axially through the unit and out the final stage discharge ports, while simultaneously permitting the previously entrained particles to continue traveling centrifugally and pass through the annular peripheral discharge chamber C and out between the peripheral annular edges 65 and 95.

The peripheral discharge flow can be increased or decreased, since the peripheral chambers are made of sheet metal material, and simply by varying the distance between the peripheral edges 65 and 95 as desired, the separator can be made to accommodate different types of material, or to vary the percentage of gaseous medium passing axially through the unit.

The peripheral discharge from the separator unit is sealed from the axial cleaned gaseous discharge by means of a gaseous seal which is supplied with a small flow of gas under pressure by a plurality of spaced gas seal vanes 99 which are supported on the outer surface of the final stage plate 90 as shown in FIGURE 3. An annular support ring 100 for the gas seal vanes 99 is positioned behind the gas seal impeller vanes 99 and is connected therewith to assi t in maintaining the gas seal impeller vanes 99 in upright position.

Immediately above and spaced a small distance away from the row of gas seal impeller vanes 99 is a curved annular gas seal ring. The gas seal impeller vanes 99 pick up gas and force it radially outward under the annular gas seal 101 through a small peripheral gap 102. The flow of gas as indicated generally by the arrow through the seal assembly makes it possible to seal off the precipitate discharge of the separator from the main cleaned gaseous medium which passes axially through the separator unit. This seal arrangement makes it possible for the unit to run continuously without having to replace or recheck seal units as would ordinarily be necessary where such ordinary seal units are used.

The entire three stage impeller assembly is removably mounted on the end of shaft 38 in the manner shown in FIGURE 3. Referring particularly to this figure, a square sectioned shaft extension 110 is shown integral with shaft 38, and having a threaded end section 112. A stop washer 116 is mounted on section 110 and abuts the end of shaft 38. The back final stage plate has a central squared opening and is fitted on the extension 110 up against the stop washer 116. A final stage impeller support hub 118 having a central square opening is fitted on the shaft extension 110 and supports the root section 85 of the final transition impeller blades 86 which are inserted within the periphery thereof as shown in the cutaway portions of FIGURE 2. The intermediate transitional plate 80 is mounted immediately behind the impeller hub 118, also having a central squared opening adapted to accurately fit on the shaft extension member 110. Behind the intermediate transitional plate 80 is an intermediate stage impeller hub 120 which also has a squared central opening adapted to fit on the extension member 110. The diameter of this hub 120 is greater than the diameter of the final stage impeller hub 118. The root section 75 of the intermediate impeller vanes are inserted within the peripheral edge portion of this hub member, as shown in FIGURE 2.

The front first stage plate 80 is mounted on the shaft extension 110 immediately behind the intermediate stage impeller hub 120, and also has a central squared opening adapted to accurately fit on the shaft extension member 110. A washer 122 is shown positioned on the extension hub immediately behind the front first stage plate 60. The members are held in position on the shaft extension 110 by a nut 124 which threadedly engages the threaded section 112. A cotter pin 126 which passes through the nut and the threaded section 112 holds the nut 124 in position.

The unit as shown in FIGURE 3 is welded together, but preferably a bolted construction is used so that it is possible to remove the several parts by removing the nut 124.

*Operation*

Referring to FIGURE 1, it will be seen that a gaseous medium carrying entrained particulate matter to be separated therefrom is supplied through the conduit D and up to the centrifugal separator unit S where it encounters the rotating impeller section I.

The gaseous medium carrying particulate matter passes axially through the impeller section where due to the rotation of the impeller vanes, the heavier particulate matter is propelled outwardly toward and through the peripheral particulate discharge section C to the interior of the precipitator P, while most of the lighter gaseous medium is moved through the several impeller stages and axially upward through the opening 18 in the top wall 10 of the precipitator unit P. It should be noted, that a stack is usually provided for the cleaned gaseous medium, although it is not shown.

As can be seen from the light arrows, the particulate discharge having a high percentage of particles to gas, passes radially outward through the peripheral annular chamber section C and down along the inside of the precipitator unit, following wall 12 or the baffle wall 20 and through the conical section 14 to the circular precipitate discharge sections 16.

The gaseous medium which is passed into the interior of the precipitator unit P, will not fall down to the discharge precipitator section 16, and will travel to the exhaust section of the precipitator on the other side of baffle wall 20 which has the small separator unit $S_a$. This separator unit operates in the same fashion as the large separator unit S to further clean the gaseous medium in that area, while also maintaining a pressure equilibrium by removing the gaseous medium from within the precipitator unit at approximately the same rate that it is introduced by the large separator unit peripheral discharge.

The depending skirt section—immediately below the separator unit $S_a$ further acts as a baffle to separate the precipitate from this unit from its intake section.

In the detailed construction of the separator unit, it will be seen from an inspection of FIGURES 2, 3 and 4 that the entire unit rotates and that the gaseous medium passes through three stages which form a tortuous axial path, while the impeller vanes of these stages progressively move the particles and part of the gaseous medium toward the outer radial peripheral discharge thereof.

The width of the ports and the impeller vanes is important in defining an efficient axial, as well as radial path for the gas-particulate suspension. The increasing width of the ports and of the impellers provides for a greater volume flow at the tips of the impeller vanes both radially and axially and thereby reduces the pressure buildup in the unit. This results in a low pressure drop across the entire separator unit which is appreciably lower than that of other type units having similar volumetric capacity.

To provide an adjustable means for determining the axial gaseous flow through the separator unit, as well as varying the percentage of particulate discharge material at the periphery of the separator unit, the outer impeller support plate members 60 and 90 are provided with an annular peripheral section which is curved inwardly to form a peripheral back pressure chamber C which has a peripheral discharge opening between the adjacent edges of the plates, the size of the discharge opening can be varied by merely bending the peripheral edges either closer or further away from each other. This provides for a back pressure adjustment on the gaseous medium as it passes axially through the separator unit to either permit more or less of the gaseous medium to be passed out of the peripheral discharge section of the separator unit.

It should be noted that since the separator unit is readily disassembled, it is possible to vary the width of the impeller vanes if desired by substituting a wider set in the assembly with thicker circular hub members 118 and 120. To permit this interchangeability, the squared shaft extension member 110 would be longer than shown in FIGURE 3.

With respect to entire separator unit, it should also be noted that it could be directly mounted within a stack with little necessity for modification of the stack structure. This is in sharp contrast to other types of centrifugal separators which are not compact and would require extensive structural modification for such an installation.

Having thus described my invention what I claim is:

1. A plural stage axial flow centrifugal unit for separating particulate matter from a gaseous medium, comprising:
   (a) a rotatable shaft having a plurality of axially spaced circular plates integral and rotatable therewithin a given direction to displace an axially flowing oncoming mass of air;
   (b) each plate having a plurality of circumferentially spaced narrow elongated ports extending outwardly from the shaft and curving backwardly away from the direction of rotation, said ports forming a wide annular perforate section on each plate;
   (c) the front stage plate having an elongated first stage impeller vane integral with and extending outwardly from the upstream side thereof adjacent to the trailing edge of each of the elongated ports of the front stage plate;
   (d) the corresponding ports of successive axially spaced, downstream disposed plates being circumferentially rearwardly spaced away from the direction of rotation;
   (e) each of the said successive plates having an elongated impeller vane integral with and disposed adjacent to the trailing edge of each of the elongated ports and which extend outwardly from the upstream side thereof to engage the downstream surface of the next adjacent plate to thereby provide a plurality of stepped axial flow paths through the unit, while leaving an open radial flow path along the length of said impeller vanes; and
   (f) nozzle means formed by the peripheral sections of said plates for providing a reduced area passage through which particles centrifugally separated from the oncoming air stream are discharged.

2. The axial flow centrifugal unit for separating particulate matter from a gaseous medium as set forth in claim 1, wherein:
   (a) said nozzle means is formed by the two outermost plates which extend inwardly toward each other at their edge to form a peripheral discharge nozzle.

3. The axial flow centrifugal unit for separating particulate matter from a gaseous medium as set forth in claim 1, wherein:
   (a) the cross sectional dimension of the said nozzle means can be varied to control radial discharge from the unit.

4. The axial flow centrifugal unit for separating particulate matter from a gaseous medium as set forth in claim 1, wherein:
   (a) each of said elongated ports progressively widen as the distance from the shaft increases;
   (b) the width of said impeller vanes also increases and their cross sectional shape is concave.

5. The axial flow centrifugal unit for separating particulate matter from a gaseous medium as set forth in claim 1, wherein:
   (a) peripheral gas seal means is disposed on one of the outermost plates for providing an annular gas seal between the unit and a supporting housing.

6. A precipitator unit comprising:
   (a) a plenum chamber having a large main discharge opening and a small auxiliary discharge opening at the top thereof;
   (b) a particulate discharge opening at the bottom of said plenum chamber;
   (c) a main particulate centrifugal axial gas flow separator unit having a peripheral particulate discharge, disposed adjacent said main opening to pass purified gases through said main discharge opening of said plenum, while depositing particulate centrifugally separated matter from a gaseous medium into said plenum;
   (d) an impure gas supply duct extending into said plenum and connected to the intake of said main centrifugal separating unit;
   (e) a small auxiliary centrifugal separator unit disposed within said plenum with its discharge side for purified gaseous medium disposed adjacent said small auxiliary gaseous discharge opening and its peripheral discharge opening and its intake side within said plenum;
   (f) elongated baffle means connected to the intake side of said auxiliary centrifugal separator unit, the flow through said auxiliary separator unit being adjusted to balance the input to the plenum chamber from said particulate discharge opening of said main centrifugal separator unit; and
   (g) both of said centrifugal separator units having peripheral nozzle means for controlling the volume of radial discharge from the separator units.

7. The precipitator unit as set forth in claim 6, wherein:
   (a) said centrifugal separator units have an annular gas seal means between them and the adjacent plenum discharge.

8. An axial flow centrifugal unit for separating particulate matter from a gaseous medium comprising:
   (a) a rotatable shaft having three axially spaced plates rigidly mounted thereon;

(b) each plate having the same number of elongated equally spaced substantially radially extending ports which increase in width as the radial distance increases;

(c) the outermost plates being flared outwardly away from the central plate in the sectors containing said ports;

(d) the alignment of the ports in the plates being circumferentially offset with respect to each other;

(e) a plurality of backwardly curved upstanding concave face impeller vanes on the upstream side of each of said plates and disposed adjacent the trailing edge of each of said ports;

(f) impeller vanes disposed between and connecting said plates thereby forming a plurality of stepped axial flow paths and radial flow paths through the unit; and (g) nozzle means formed by the peripheral sections of the outermost of said plates which extend inwardly toward each other to form a peripheral discharge nozzle.

9. The axial flow centrifugal unit for separating particulate matter from a gaseous medium as set forth in claim 8, wherein:

(a) a chord width of said vanes is equal to the port width at any given radial point.

10. The axial flow centrifugal unit for separating particulate matter from a gaseous medium as set forth in claim 8, wherein:

(a) said unit has peripheral gas seal means adjacent the edge of the outer periphery.

11. The axial flow centrifugal unit for separating particulate matter from a gaseous medium as set forth in claim 8, wherein:

(a) the ports of the last plate through which the gaseous medium is passed are displaced radially inwardly of the ports in the other plates.

12. The axial flow centrifugal unit for separating particulate matter from a gaseous medium as set forth in claim 8, wherein:

(a) said parts being disposed a substantial radial distance from the center of said plates.

References Cited

UNITED STATES PATENTS

| | | | |
|---|---|---|---|
| 791,517 | 6/1905 | Walker | 55—457 X |
| 1,232,464 | 7/1917 | Houghton | 55—407 |
| 1,505,564 | 8/1924 | Jett | 55—406 X |
| 2,060,168 | 11/1936 | Brock | 55—407 X |
| 2,126,481 | 8/1938 | Lapp et al. | 55—408 X |
| 2,290,664 | 7/1942 | Allardice | 55—459 X |
| 2,304,128 | 12/1942 | Thomas. | |
| 2,325,159 | 7/1943 | Coghill | 55—400 X |
| 2,368,961 | 2/1945 | Arnold | 55—406 X |
| 2,542,549 | 2/1951 | McBride | 55—347 X |
| 2,591,396 | 4/1952 | Bergner | 55—400 X |
| 2,945,553 | 7/1960 | Brock | 55—408 X |
| 3,126,263 | 3/1964 | Schwab | 55—408 X |
| 3,283,484 | 11/1966 | Nomar | 55—408 |

FOREIGN PATENTS

| | | |
|---|---|---|
| 84,338 | 6/1921 | Austria. |
| 805,984 | 9/1936 | France. |
| 1,053,943 | 10/1953 | France. |
| 1,205,723 | 10/1959 | France. |
| 384,221 | 10/1923 | Germany. |
| 505,514 | 8/1930 | Germany. |

HARRY B. THORNTON, *Primary Examiner.*

D. TALBERT, *Assistant Examiner.*